Patented May 29, 1928.

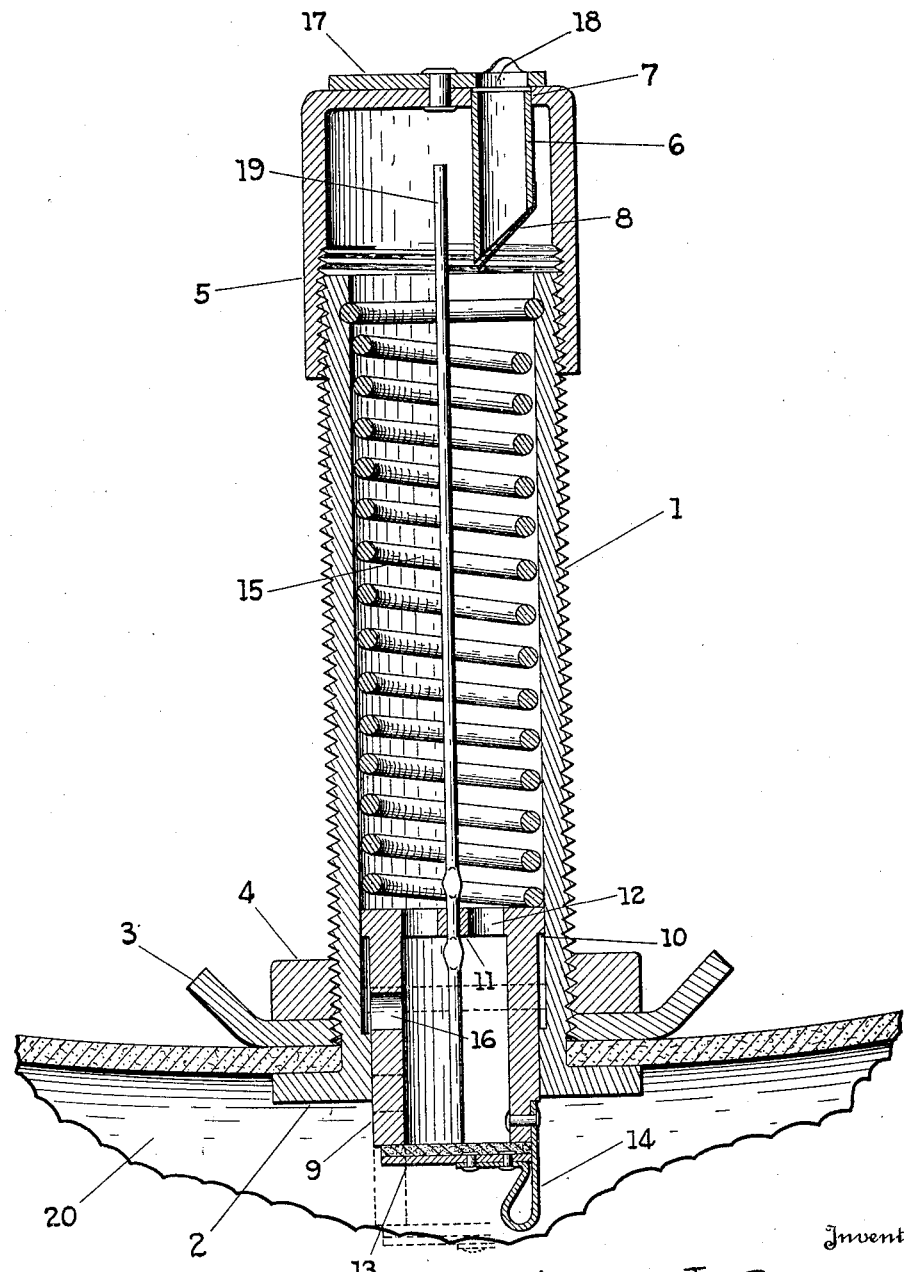

1,671,167

UNITED STATES PATENT OFFICE.

FRED J. SHELBY, OF INDIANAPOLIS, INDIANA.

COMBINED TIRE VALVE AND PRESSURE ALARM.

Application filed October 21, 1927. Serial No. 227,765.

This invention relates to a combined tire tube valve stem and pressure indicator for pneumatic tires, and one feature of the invention is the provision of means for giving a signal for notifying the occupant of the car that the pressure in the tire has been reduced to a certain predetermined degree, while driving, or otherwise.

A further feature of the invention is the provision of spring pressed means for normally retaining the alarm mechanism inoperative.

A further feature of the invention is the provision of means for admitting air into the inner tube, or for deflating the same.

A further feature of the invention is the provision of means for cutting out the alarm mechanism and preventing further escape of air from the tube, after the alarm has been given, or when desired.

Other objects and advantages will be hereinafter more fully set forth and pointed out in the accompanying specification.

In the accompanying drawing which is made a part of this application, the figure is an enlarged sectional view thru the combined tube stem and alarm mechanism.

Referring to the drawing, 1 indicates the stem portion of the device, which is preferably exteriorly threaded and provided with a flange head 2, at its inner end, said head entering the tube 20, in the conventional or any preferred manner. The usual form of spanner 3 and nut 4 are placed exteriorly of the tube for holding the stem in engagement therewith.

Adapted to thread onto the outer end of the stem 1, is a cap 5, to which is attached an alarm mechanism; in this instance a whistle 6, an opening 7 being provided thru the cap 5 in which the outer end of the whistle is secured, the opposite end of the whistle being tapered in the quill or clarinet manner and provided with a reed 8.

In order to normally prevent the air in the inner tube 20, being discharged into the stem so as to sound an alarm by actuating the whistle 6, a valve 9 is slidably mounted in the inner end of the stem 1 in such manner that a portion thereof will extend downwardly within the tube and the remainder within the stem, the movement of the valve into the tube being limited by means of a shoulder 10 at the outer end of the valve. The valve 9 is hollow and provided with a closure 11 at its outer end, thru which are provided ports 12, thru which air may pass into the tube or escape therefrom, while a flap valve 13 is positioned over the inner end of the valve 9, and normally held seated over the open end of same by means of a spring hinge 14, one end of the spring hinge being attached to the valve proper 9, and the opposite end to the flap valve 13, said spring hinge normally holding the flap valve in closed position, as shown in the drawing.

Interiorly of the stem 1 is a coiled spring 15, the outer end of which is anchored to said stem, while the opposite end thereof bears against the closure 11 of the valve 9, said spring serving to move the valve 9 inwardly when the air pressure within the tube decreases. In order to permit a sufficient amount of air to reach the whistle 6 to actuate same to a degree to sound a signal, a port 16 is formed thru the wall of the valve 9, and this port is so placed that the pressure within the tube will have to be decreased to a certain extent before the port 16 will be exposed by said spring beyond the inner end of the stem 1, as indicated by dotted lines.

In order to stop further escape of air thru the whistle, after the alarm has been heard, a plate 17 is pivoted over the outer end of the cap 5, and by manually rotating the plate until the opening 18 therethru is moved out of registration with the end of the whistle. Communication thru the whistle will thus be stopped, by shutting off further escape of air. As soon as the tire tube is again inflated, the plate is again rotated until the opening 18 is again in registration with the end of the whistle 6 so that it can thus again be sounded when the air pressure of the tire decreases.

A rod 19 extends longitudinally thru the stem 1 and is attached to the valve 9 by being loosely disposed thru the closure 11, said rod serving to unseat the flap valve 13 by contact at its outer end with the conventional air valve when placed over the outer end of the stem 1 for inflating the tube, or when other pressure is applied thereon, as when the tube is to be deflated by manual manipulation of said rod.

When the inner tube 20 is properly inflated, the valve 9 and parts associated therewith, normally rest in the position shown in the drawing with the port 16 within the stem 1 but when the tire becomes sufficiently deflated, the spring 15 will move the valve 9 inwardly and the port 16 to a point beyond the inner end of the stem 1, so that air will escape thru said ports in the valve 9 and cause the whistle to emit a warning sound, such alarm continuing until the driver operates the plate 17 to stop the passage of air thru said whistle.

By giving the signal, the tire and tube are saved from rim cut or other injury and the valve 9 and tension of the spring 15 may be so arranged that the alarm will be given when the pressure within the tube has been reduced to any determined degree. In the absence of such an alarm the operator of the vehicle many times is using his tires at an undesirable pressure because he is unaware of the low pressure of the individual tires.

While the description and drawing illustrate in a general way, certain instrumentalities which may be employed in carrying the invention into effect, it is evident that many modifications may be made in the various details, without departing from the scope of the appended claims, it being understood that the invention is not restricted to the particular forms, herein described.

I claim as my invention:

1. In an alarm mechanism for tire tubes and the like, a hollow stem; a cap adapted to fit over the outer end of said stem; an alarm mechanism attached to said cap; means for stopping the operation of the alarm mechanism and the escape of air therethru; a valve mechanism slidably mounted in the inner end of said stem for controlling the escape of air into said stem; and yielding means for moving said valve inwardly when the air within the tube has been decreased to a prescribed degree.

2. In an alarm mechanism for tire tubes and the like, a hollow stem; a cap adapted to fit over the outer end of said stem; an alarm mechanism attached to said cap; means for stopping the operation of the alarm mechanism and the escape of air therethru; a valve mechanism slidably mounted in the inner end of said stem for controlling the escape of air into said stem; and yielding means for operating said valve in opposition to the air pressure within the tire tube when the air within the tube has been decreased to a prescribed degree.

3. In an alarm mechanism for tire tubes and the like, a valve slidably mounted within the inner end of said stem; and projecting within the tire tube; means for limiting the inward movement of said valve; means for moving said valve inwardly when the pressure thereagainst is reduced, said valve having ports for the passage of air; a cap attached to the outer end of said stem having an opening thru its closed end; an alarm mechanism entering said opening; and means for closing said opening.

4. In an alarm mechanism for tire tubes and the like, a hollow stem; means for attaching the stem to an inflatable object; a hollow valve slidable within said stem, one end and side wall of the valve having ports for the passage of air; a flap valve for closing the inner end of said first valve; means for moving said first valve inwardly when the air pressure against said valve decreases, for exposing the port in the side wall of the valve and permitting the escape of air thru said ports; a cap fitting over the outer end of said stem; an alarm device attached to said cap and adapted to be energized by the air escaping thru said ports; and means for cutting out the alarm and preventing further escape of air therethru.

5. In an alarm mechanism for tire tubes and the like, a hollow stem; an alarm mechanism at the outer end of said stem; a sliding valve in the inner end of said stem, said valve having air ports therethrough, yielding means for actuating said valve as the air pressure thereagainst is decreased, a flap valve for closing one end of said sliding valve; and a spring hinge for normally holding the flap valve in closed position.

In testimony whereof, I have hereunto set my hand on this the 17th day of October, 1927, A. D.

FRED J. SHELBY.